(12) United States Patent
Kharoufeh

(10) Patent No.: US 12,336,459 B2
(45) Date of Patent: Jun. 24, 2025

(54) WEED BARRIER/MOISTURE RETENTION COVER FOR BAGGED OR POTTED PLANTS

(71) Applicant: Khristopher Kharoufeh, Anola (CA)

(72) Inventor: Khristopher Kharoufeh, Anola (CA)

( * ) Notice: Subject to any disclaimer, the term of this patent is extended or adjusted under 35 U.S.C. 154(b) by 0 days.

(21) Appl. No.: 17/572,110

(22) Filed: Jan. 10, 2022

(65) Prior Publication Data

US 2022/0248615 A1 Aug. 11, 2022

(30) Foreign Application Priority Data

Feb. 11, 2021 (CA) .................................... 3108493

(51) Int. Cl.
*A01G 13/00* (2006.01)
*A01G 13/31* (2025.01)

(52) U.S. Cl.
CPC .................................... *A01G 13/31* (2025.01)

(58) Field of Classification Search
CPC .... A01G 13/0281; A01G 13/02; A01G 13/04; A01G 9/1438
See application file for complete search history.

(56) References Cited

U.S. PATENT DOCUMENTS

| | | | | |
|---|---|---|---|---|
| 1,910,289 A * | 4/1932 | Hoag | ................ | A01G 13/0281 |
| 1,931,602 A * | 10/1933 | Colman | ............ | A01G 13/0281 |
| 3,305,969 A * | 2/1967 | Mattson | ............ | A01G 13/0281 |
| 3,704,004 A * | 11/1972 | Carter | ................ | E04H 17/00 |
| | | | | 256/1 |
| 3,727,347 A * | 4/1973 | Barnes | ................ | A01G 9/00 |
| | | | | 47/32 |
| 5,058,317 A * | 10/1991 | McMurtrey | ............ | A01G 13/02 |
| | | | | 47/25 |
| 5,085,001 A * | 2/1992 | Crawley | ................ | A01G 17/00 |
| | | | | 47/25 |
| 5,231,793 A * | 8/1993 | Allen | ................ | A01G 17/00 |
| | | | | 47/25 |
| 6,128,852 A * | 10/2000 | Hansen | ................ | A01G 17/00 |
| | | | | 47/25 |
| D437,194 S * | 2/2001 | Rivas | ................ | D8/1 |
| D751,355 S * | 3/2016 | Vizachero | ............ | A01G 13/043 |
| | | | | D8/1 |
| 10,561,074 B2 * | 2/2020 | Emory | ................ | A01G 13/02 |
| 2007/0175093 A1 * | 8/2007 | Aery | ................ | A01G 13/02 |
| | | | | 47/31.1 |

(Continued)

*Primary Examiner* — Joshua J Michener
*Assistant Examiner* — Henry Hooper Mudd
(74) *Attorney, Agent, or Firm* — Kyle R Satterthat; Ryanw Dupuis; Ade & Company Inc.

(57) ABSTRACT

A weed barrier/moisture retention device for covering soil of a bagged or potted plant. The cover features a disc of flexible weed barrier fabric having an outside perimeter edge situated at a radial distance from a center point of said fabric. A slit the fabric emanates outwardly away from the center point and intersects with the outside perimeter edge. Matable fastening elements are secured to the fabric at slit-adjacent edge regions thereof, and are selectively fastenable to one another in order to cooperatively close off the slit. In use, the slit of the fabric is slipped around a stalk of a bagged or plotted plant from one side thereof, and the fastening elements are coupled together at an opposing side of the stalk, thus forming a closed loop that provides a full 360-degree span of soil coverage around the stalk.

17 Claims, 3 Drawing Sheets

(56) References Cited

U.S. PATENT DOCUMENTS

| | | | | |
|---|---|---|---|---|
| 2008/0202023 | A1* | 8/2008 | Moore | A01G 13/00 |
| | | | | 47/9 |
| 2008/0271366 | A1* | 11/2008 | Thompson | A01G 7/06 |
| | | | | 47/9 |
| 2011/0258922 | A1* | 1/2011 | Frederick | A01G 1/00 |
| | | | | 47/32.3 |
| 2013/0036666 | A1* | 2/2013 | Estepp | A01G 29/00 |
| | | | | 47/48.5 |
| 2014/0130407 | A1* | 5/2014 | Langford | A01G 13/02 |
| 2015/0313094 | A1* | 11/2015 | Stojakovic | A01G 9/02 |
| 2016/0374277 | A1* | 12/2016 | Lortscher | A01G 25/02 |
| 2017/0196173 | A1* | 7/2017 | Naganuma | A01G 13/02 |
| 2017/0223906 | A1* | 8/2017 | Castellucci | A01G 13/02 |
| 2018/0054981 | A1* | 3/2018 | Work | A01G 13/10 |
| 2018/0125015 | A1* | 5/2018 | Marshall | A01G 9/02 |
| 2021/0161322 | A1* | 6/2021 | Dinkins | A47G 33/04 |

* cited by examiner

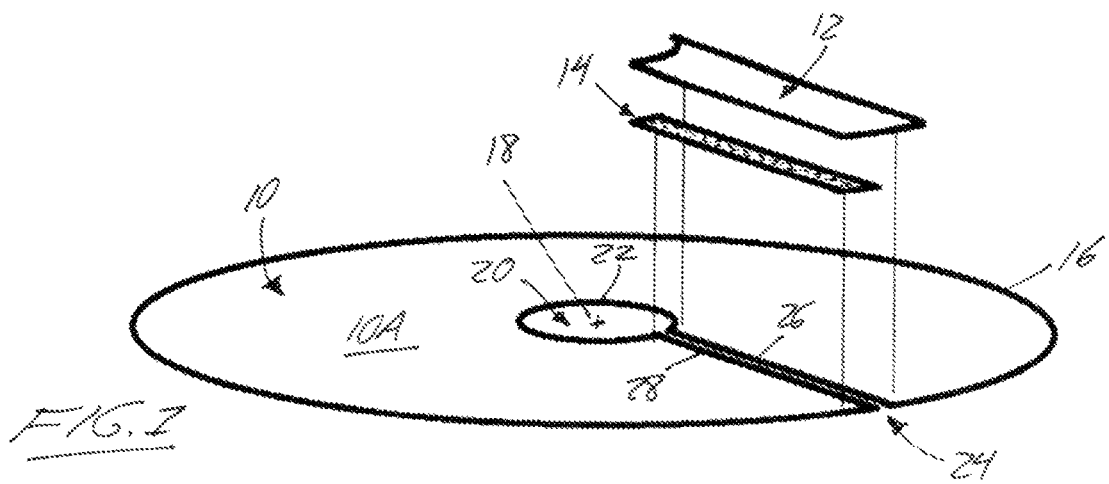
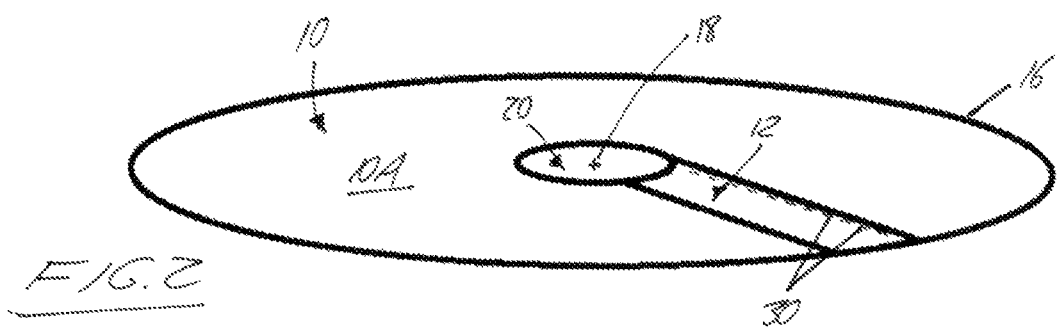
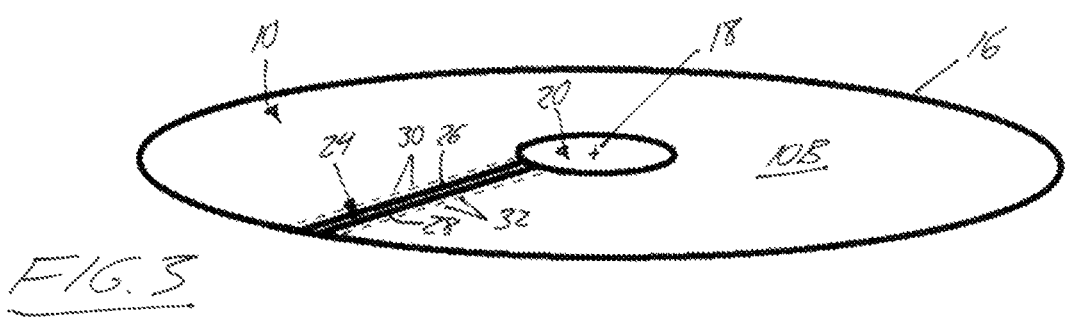
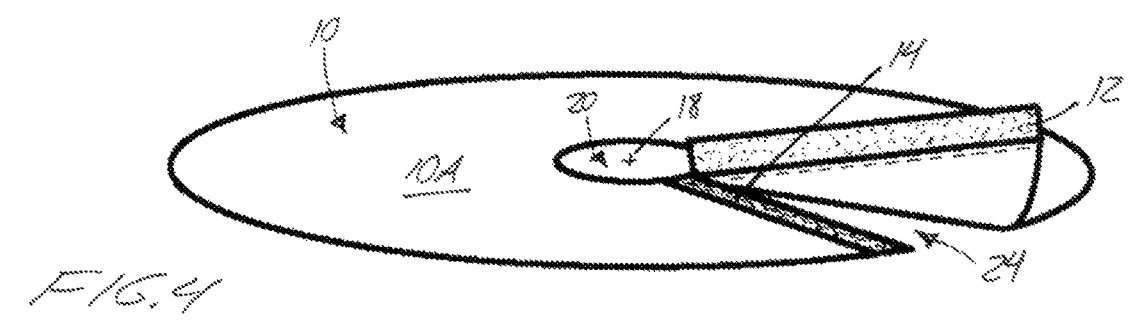

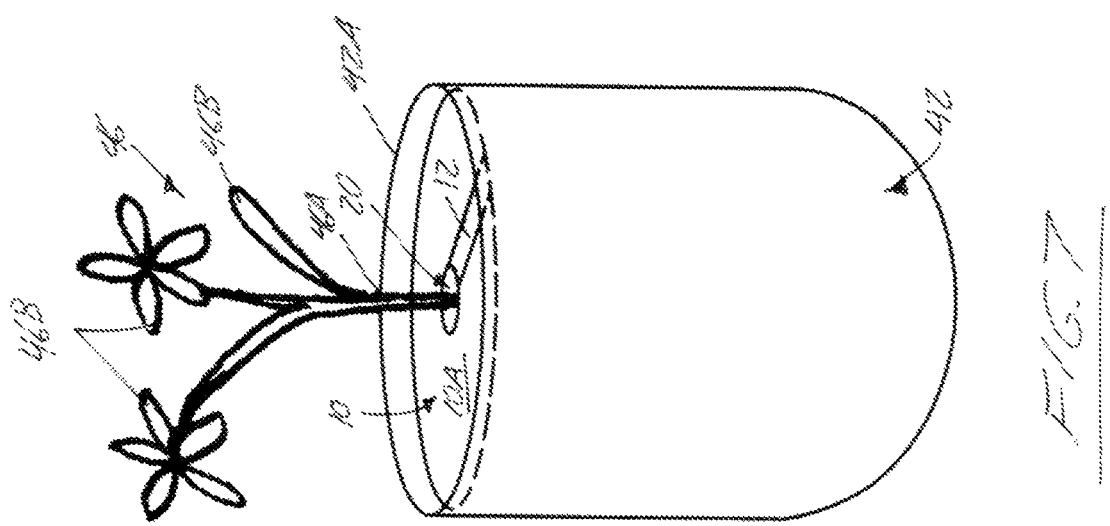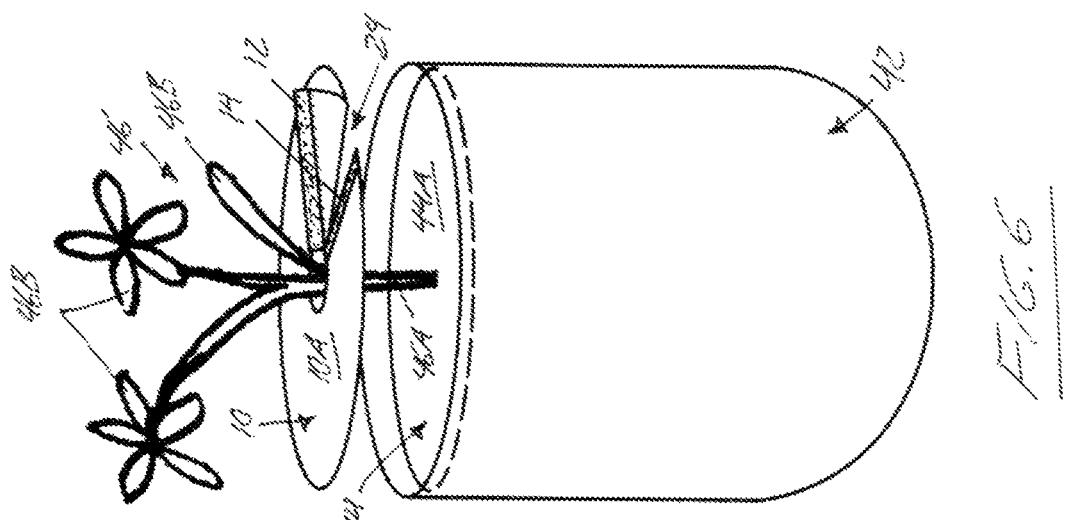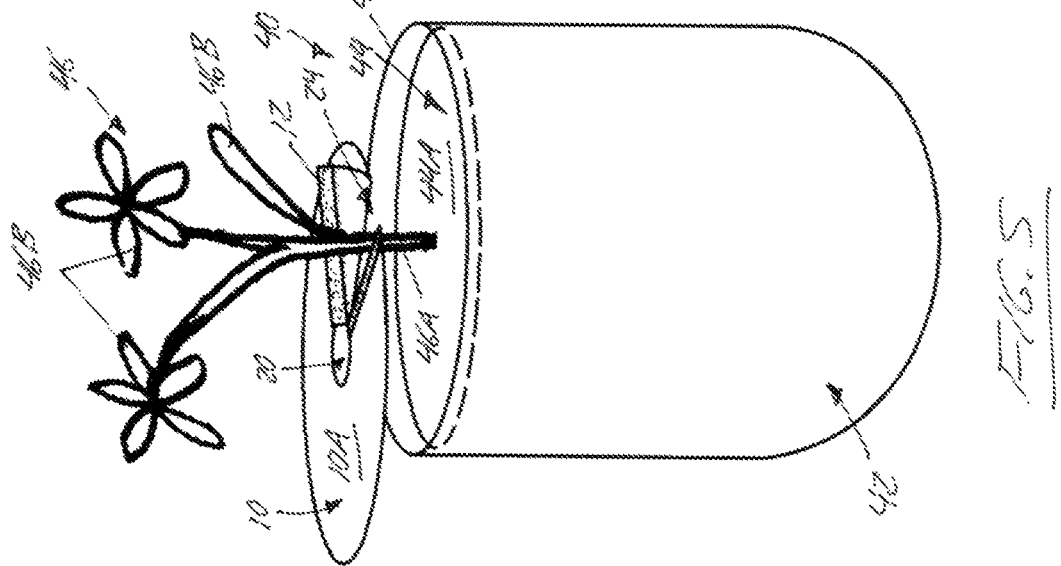

US 12,336,459 B2

WEED BARRIER/MOISTURE RETENTION COVER FOR BAGGED OR POTTED PLANTS

CROSS-REFERENCE TO RELATED APPLICATIONS

This application claims benefit under 35 U.S.C. 119(a) of Canadian Patent Application No. 3,108,493, filed Feb. 11, 2021, the entirety of which is incorporated herein by reference.

FIELD OF THE INVENTION

The present invention relates generally to soil covers for bagged or potted plants.

BACKGROUND

Examples of soil covers for covering the soil of bagged or potted plants can be seen, for example, in prior granted patents CA2834034, EP1424004, U.S. Pat. Nos. 3,940,884 and 532,562, and in prior published patent application CN107173131. Different purposes contemplated in these prior documents for such soil covers include weed barrier functionality, moisture retention, and pest control. Disclosed soil covers include round disc-shaped pieces of fabric or paper, typically provided with a singular radial slit emanating from a central hole or center point of the disc and intersecting an outer circumference of the disc. Via the slit, this disc can be slipped into place around the stalk of a bagged or potted plant into a useful position substantially covering the surface of the surrounding soil around the stalk.

However, there remains room for improvement, and applicant has designed a novel soil cover with beneficial features lacking in those of the prior art.

SUMMARY OF THE INVENTION

According to one aspect of the invention, there is provided a soil covering device for covering soil of a bagged or potted plant in a laid flat position atop said soil, said cover comprising a disc of flexible fabric that has an outside perimeter edge situated at a radial distance from a center point of said disc and running along a circular path in a circumferential direction around said center point, and at least one slit in said disc that emanates outwardly away from said center point and intersects with said outside perimeter edge, said slit being bordered on opposing sides thereof by first and second edge regions of the disc, said first and second edge regions having first and second fastening elements secured thereto, of which the first and second fastening elements are configured for selectively mateable fastening to one another other to thereby cooperatively close off said slit, wherein said slit is bordered on opposite sides thereof by respective first and second boundary edges of said disc, said first and second boundary edges denote terminal boundaries of said first and second edge regions, said first fastening element has an attached portion that overlies the first edge region of the disc, and a free portion that juts outwardly beyond said first edge region in overhanging relation from the first boundary edge in the circumferential direction of the disc, and said free portion overhangs from the first boundary edge by a distance that, in the circumferential direction of the disc, exceeds a width of the slit so that the free portion spans fully across the slit into overlapping relation to the second fastening element, thereby enabling the disc to lay flat atop the soil with said first and second fastening elements mated together.

According to another aspect of the invention, there is provided a method of using the forgoing soil covering device, said method comprising:

with the first and second fastening elements uncoupled from one another, and the slit therefore opened, slipping the open slit around a stalk of the bagged or potted plant from a first side thereof to place the fastening elements on an opposing second side of the stalk; and coupling said fastening elements together into a mated state on said second side of the stalk, thereby forming a fully closed loop around said stalk, and with the fastening elements in said mated state, laying the disc flat atop the soil of the bagged or potted plant, whereby the mated state and the coupled-together fastening elements prevent inadvertent opening of said closed loop, thereby maintaining a full 360-degree span of soil coverage around said stalk.

According to yet another aspect of the invention, there is provided a soil covering device for covering soil shared by a plurality of bagged or potted plants sharing a common pot or grow bag, said cover comprising a disc that is at least partially composed of flexible fabric and has an outside perimeter edge situated at a radial distance from a center point of said disc, and a plurality of slits in said disc that emanate outwardly toward, and intersect with, said outside perimeter edge, wherein said plurality of slits residing in non-intersecting relation to one another at angularly spaced positions around a center point of the disc, and each originate from a different respective starting point form which the slit extends toward the outside perimeter of the disc, whereby during placement of the device into a working position covering said soil, each slit accommodates a respective stalk of one of said bagged or potted plants of said common pot or grow bag.

BRIEF DESCRIPTION OF THE DRAWINGS

Preferred embodiments of the invention will now be described in conjunction with the accompanying drawings in which:

FIG. 1 is an exploded top perspective view of a soil cover according to one embodiment of the present invention for covering the normally exposed soil surface of a bagged or potted plant.

FIG. 2 is an assembled top perspective view of the soil cover in a closed position.

FIG. 3 is an assembled bottom perspective view of the soil cover in the closed position.

FIG. 4 is an assembled top perspective view of the soil cover in an open position.

FIGS. 5 and 6 are top perspective views of a bagged/potted plant during placement of the soil cover around a stalk of the plant.

FIG. 7 is a top perspective view of the bagged/potted plant with the soil cover in a final working position closed around the stalk of the plant and lying atop the surrounding soil surface in fully-covering relation thereto.

DETAILED DESCRIPTION

Figure 8:
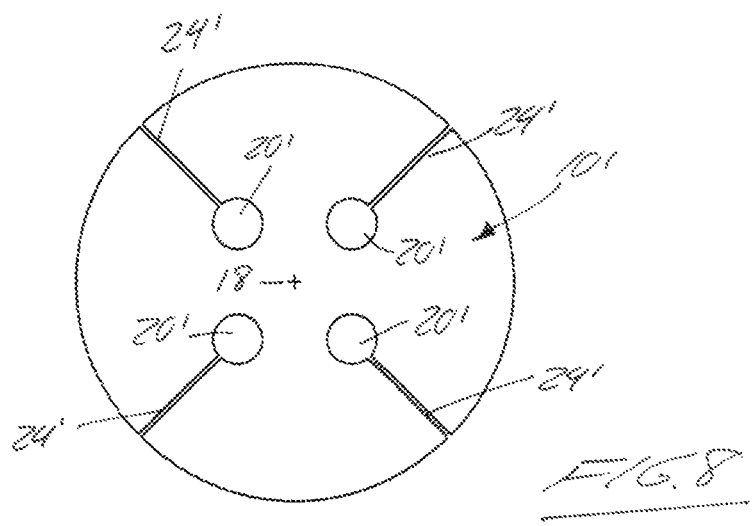
FIG. 8 is a top plan view of a modified fabric disc for an alternative embodiment of the soil cover that is adapted for use with multiple plants sharing a common pot or grow bag.

The drawings show a soil cover of the present invention, which is composed of a combination of a flexible fabric disc 10 and a pair of cooperative fastening elements 12, 14. The disc 10 is preferably made of one or more layers of weed barrier fabric, and the fastening elements are preferably strips of hook and loop fastener. In a known manner, such fasteners 12, 14 are detachably fastenable to one another to enable selective user manipulation thereof between a mated state of coupled relation to one another, and an unmated state of decoupled relation to one another.

The disc 10 is circular in shape, thus having a round outer circumference denoted by an outside perimeter edge 16 that resides at a uniform radial distance from a center point 18 of the disc. In the illustrated example, the disc is an annular disc having a central hole 20 therein that shares the same radial center point 18 as the outside perimeter edge 16, but whose boundary edge 22 at an inside perimeter of the annular disc resides at a much shorter radial distance from the center point 18. The central hole 20 is relatively small compared to the intact span of fabric between the disc's inside and outside perimeter edges. That is, a radial measure of the fabric between the inside and outside perimeter edges exceeds the radius of the central hole 20, and preferably also exceeds a diameter thereof.

The disc has a singular radial slit 24 therein that emanates outwardly away from the center point 18, and that intersects both the inside and outside perimeter edges 16, 22 of the annular disc 10. The slit 24 is bordered on its two sides by radially-oriented first and second boundary edges 26, 28 of the disc's split annular shape. The first fastening element 12 is attached to a topside 10A of the disc 10 at a first edge region thereof that immediately neighbours the first boundary edge 26. The second fastening element 14 is likewise attached to the topside of the disc 10 at a second edge region thereof that immediately neighbours the second boundary edge 26. Each boundary edge thus forms a respective terminal boundary of the respective edge region of the disc. The first and second fastening elements 12, 14 are of inverted relative orientation to one another, meaning that in the illustrated example, the hook or loop fibers of the first fastening element 12 face downward, while the matable loop or hook fibers of the second fastening element 14 face upward.

The first fastening element 12 is attached to the first edge region of the disc 10 in a position of overhanging relation to the first boundary edge 26. The first fastening element 12 thus has an attached portion secured to the first edge region of the disc 10 in overlying relation thereto, and a free portion that juts outwardly past the boundary edge 26 in a circumferential direction of the disc. This way, the free portion of the first fastening element overlaps the second edge region of the disc when the disc is laid out flat. The attached portion of the first fastening element 12 is preferably attached by sewn connection to the fabric disc 10, as shown by a first set of stitches 30 near the first boundary edge 26 of the disc 10. The second fastening element is instead secured in non-overhanging relation to the second boundary edge 28 of the disc, and thus resides entirely within the bounds of the disc's second edge region, and does not protrude beyond the second boundary edge 28 of the disc 10. The second fastening element 14 is preferably attached by sewn connection to the fabric disc 10, as shown by a second set of stitches 32 near the second boundary edge 28 of the disc 10.

The upward facing loop or hook fibers of the second fastening element 14 thus reside directly over the second boundary region of the disc 10, whereby the overlapping position of the free portion of the overhanging first fastening element 12 will have its downwardly facing hook or loop fibers mate with the loop or hook fibers of the second fastening element 14 when the overhanging first fastening element 12 is laid flat atop the second fastening element 14. This is shown in FIGS. 2 and 7, and denotes a closed position of the soil cover. Here, the first fastening element 12 spans across the slit 24 in its mated position with the second fastening element 14, thereby effectively closing off the slit 24 of the disc 10 at the topside 10A thereof. As a result, the fabric disc and the attached fastening elements 12, 14 cooperatively form a fully closed loop around the central opening 18 of the disc. FIG. 3 also shows the closed position of the soil cover, but from the underside 10B of the disc 10, where the slit 24 can still be seen.

On the other hand, the disc 10 can be manipulated into an open position by manually decoupling of the first fastening element 12 from the second fastening element 14, and pulling the first boundary edge 26 of the disc away from the second boundary edge 28. This folding back of the first boundary edge 26 away from the second boundary edge 26 opens up the slit, thereby creating an enlarged gap between the two boundary edges, as shown in FIG. 4.

FIG. 5 through 7 illustrate a bagged or potted plant 40 featuring an outer pot or breathable fabric grow bag (a.k.a. air pruning bag) 42, a volume of soil 44 that is contained within the pot or bag 42 and has an exposed upper surface 44A situated below a rim of the pot/bag 42, and a plant 46 that was previously planted in the soil 44 and now has an emerged stalk 46A that rises from the soil surface 44A and, for example, supports a leafy canopy 46B of the plant 46. FIGS. 5 through 7 illustrate sequential stages in placement of the soil cover into an eventual working position, shown in FIG. 7. In this working position, the soil cover fully, or at least substantially, covers the soil surface 44A around the stalk 46A of the plant 46, for beneficial purposes such as preventing emergence of weeds from the soil, and/or helping retain moisture within the soil.

Firstly, referring to FIG. 4, a user uncouples the first and second fastening elements 12, 14 from one another to open up the slit 24 in the disc 10. Next, holding the opened disc 10 in their hands, the user manually slides the open slit 24 around the stalk 46A of the bagged or potted plant 46 from a first side thereof (e.g. left side in FIG. 5), and advances the disc 10 across the plant 46 until the stalk 46A thereof is received in the central opening 20 of the disc. This generally aligns the stalk 46A with the center point 18 of the disc 10, as shown in FIG. 6. This also places the fastening elements 12, 14 on a second side of the stalk (e.g. right side in FIG. 6) that opposes the first side thereof from which the disc 10 was slid into place. The fastening elements 12, 14 are then coupled together on this second side of the stalk, whereby the soil cover now forms a fully closed loop around the stalk. Referring to FIG. 7, the closed disc 10 is laid atop the soil surface 44A. The closed-loop span of the disc 12 around the stalk of the plant provides a full 360-degree span of soil coverage around the stalk, thus fully, or at least substantially, covering the surface 44A of the soil 44 between the stalk 46A of the plant 46 and the rim 42A of the pot/bag 42.

Since the slit 24 is held closed by the mated-together first and second fastening elements 12, 14, the soil cover is better maintained in its flat working position atop the soil surface 44A to ensure ongoing full or substantial coverage thereof. Fastened together, the boundary edges 26, 28 of the disc 12 can't be separated by blowing wind, insect activity, animal activity, or other external forces that may exist in the plant's vicinity.

While the illustrated embodiment employs strips of hook and loop fastener that each span a full or substantial entirety of the slit's radial length, smaller discrete pieces of hook and loop fastener may alternatively be secured to the edge regions of the disc at one or more points along the slit's radial length. As an alternative to hook and loop fastener, magnetically attractable magnetic fastening elements may alternatively be used, with a first magnetic fastening element secured to the first edge region of the disc and a second magnetic fastening element secured to the second edge region of the disc. In such instances, at least one of the two magnetically-attractable elements is magnetic, i.e. exerts a magnetic field. The other element may also be magnetic, but placed in an orientation in which its pole direction is reversed relative to the first element so that the opposing magnetic poles of two elements are magnetically attracted, or may simply be ferromagnetic so as to be magnetically attractable to the magnetic element.

Commercially available sew-in magnets, conventionally used to create magnetic snap fasteners for various applications, or flexible magnetic tape, may be used for such magnetic fastening purposes. To create the overlapping closure between the two fastening elements, the first magnetic fastening element may comprise a fabric extension flap sewn to the main disc 10 at the first edge region thereof in overhanging relation to the first boundary edge 26, with one or more magnets, ferromagnetic pieces or a length of magnetic tape sewn or otherwise affixed to the free portion of this overhanging flap so as align over one more corresponding magnets, ferromagnetic pieces, or magnetic tape secured at the second edge region of the main disc 10.

While the illustrated embodiment has both fastening elements attached to the main disc 10 at the topside 10A thereof, one or both fastening elements may alternatively be attached to the underside 10B of the disc 10, provided the appropriate relative orientations of the two elements are maintained to allow selective mating thereof. For example, the first fastening element 12 could be sewn to the underside 10B of the disc, in the same mating-side-down orientation in which it is shown in the drawings. In such position, the first fastening element 12 would still be matable with the illustrated second fastening element 14 that is sewn mating-side-up on the topside 10A of the disc 10. Alternatively, the illustrated fastening elements could both be sewn to the underside 10B of the disc, but each in a position of inverted relation to that shown in the drawings.

While the illustrated disc 10 has only a singular fabric layer, the disc may alternatively have a multi-layer construction, in which case magnetically fastened embodiments could have the magnetic or ferromagnetic component(s) of the non-overhanging fastening element installed internally between two layers of the multi-layer disc. Likewise, the overhanging fastening element could employ a multi-layer extension flap within which magnetic or ferromagnetic component(s) of the fastening element is/are internally contained between layers of the flap.

Figure 9:
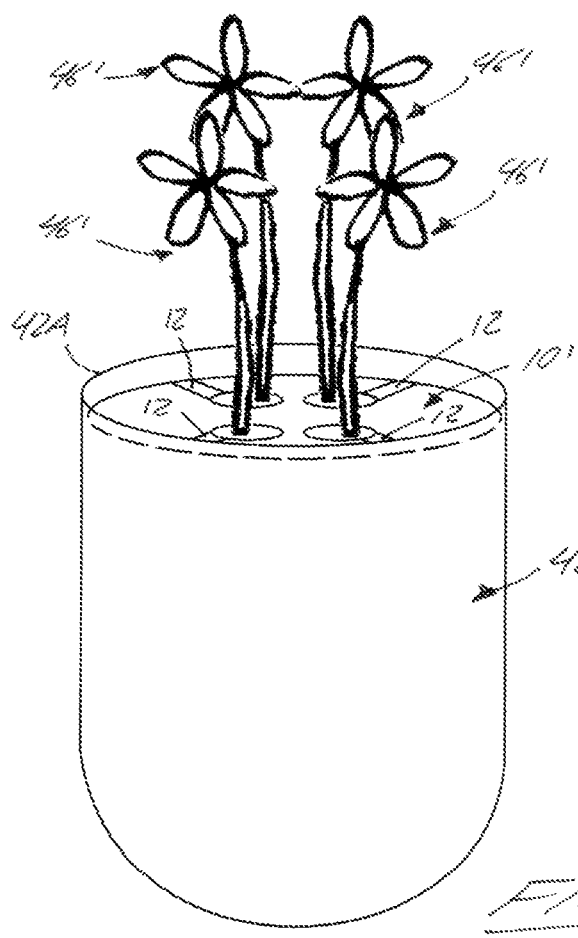
FIG. 9 is a top perspective view showing use of the alternate embodiment in a multi-plant bag or pot.

The embodiment shown in FIGS. 1 through 7 is designed for use with a single plant, and thus features a singular central stalk hole 20 and a singular split 24 emanating outwardly therefrom to the outside perimeter edge of the disc 10. FIGS. 8 and 9 illustrate an alternate embodiment in which the disc 10' is modified to have a plurality of discrete holes 20' at angularly spaced positions around the center point 18 at a radial distance spaced outwardly from the center point 18, but inwardly from the outside perimeter edge 16. A respective slit 24' radiates outwardly from each hole 20' to the outside perimeter edge 16 of the disc 10'. The starting point from which each slit originates is thus different from each of the other slits, and resides at a distance spaced radially outward from the center point 18 of the disc. This way, the slits are angularly spaced apart for one another around the center point, and no two slits intersect. A central area of the disc between the holes remains intact, and serves to join together the different disc segments that are each delimited between two neighbouring slits.

A respective pair of first and second fastening elements are sewn to the disc 10 at the two respective edge regions of the disc that neighbour each slit to enable selective opening and closing of the slit in the same manner described for the single-slit embodiment of the earlier figures, so that once again, relative sliding between each slit and the stalk of a respective plant can be used to place the stalk of the plant in a position standing upright through the respective hole 20'.

However, instead of sliding the disc 10' into place from one side of a singular stalk, the outside perimeter edge of the disc is temporarily folded or curled upward, collapsing the disc down to a smaller width accommodatable into a central space between the multiple plants. The collapsed disc in inserted downwardly or laterally into this central space, into a position aligning each slit 24' with the stalk of one of the plants 46', and then the outside perimeter edge 16 is folded back down in order to seat the disc 10' flat atop the soil. During this folding of the disc's outside perimeter edge 16 downwardly toward the soil surface and outwardly toward the rim 42A of the pot/bag 42, each slit 24' thus slips across the stalk of the respective plant from an inner side thereof that faces the disc's center point 18 to an outer side of the stalk that faces the outer rim 42A of the pot/bag 42. This places the respective pair of fastening elements at the outer side of the plant stalk, where the fastening elements are then fastened together. Once the plurality of slits are all fastened closed, the closed disc 12 spans a full 360-degrees around the stalks of the plants, both individually and collectively, thus once again covering a substantial entirety of the soil's surface.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A soil covering device for covering soil of a bagged or potted plant in a laid flat position atop said soil, said cover comprising a round disc of flexible fabric that has an outside perimeter edge situated at a radial distance from a center point of said disc and running along a circular path in a circumferential direction around said center point, and at least one slit in said disc that emanates outwardly away from said center point and intersects with said outside perimeter edge, said slit being bordered on opposing sides thereof by first and second edge regions of the disc, said first and second edge regions having first and second fastening elements affixed thereto, of which the first and second fastening elements are configured for selectively mateable fastening to one another other to thereby cooperatively close off said slit, wherein said slit is bordered on opposite sides thereof by respective first and second boundary edges of said disc, said first and second boundary edges denote terminal boundaries of said first and second edge regions, said first fastening element has an affixed portion that overlies the first edge region of the disc and is affixed thereto, and a free portion that juts outwardly beyond said first edge region in overhanging relation from the first boundary edge in the circumferential direction of the disc, and said free portion overhangs from the first boundary edge by a distance that, in the circumferential direction of the disc, exceeds a width of the slit so that the free portion spans fully across the slit into overlapping relation and fastened connection to the second fastening element, thereby achieving a flat working position of the disc that is void of both (a) any overlapping of the disc with itself at either boundary edge on either side of said slit, and (b) any deviation to a circumferential outer shape of the disc at the outer perimeter thereof, whereby the flat working position is operable, upon closing of the disc into said flat working position around a stalk of the bagged or potted plant, to lay the disc flat atop a soil surface of the bagged or potted plant in substantially full coverage of said soil surface from adjacent the stalk of the bagged or potted plant up to a round rim of a bag or pot of said bagged or potted plant.

2. The device of claim 1 wherein said second fastening element resides entirely within the bounds of the second edge region of the disc and in non-overhanging relation to the second boundary edge of the disc.

3. The device of claim 1 wherein each fastening element comprises hook or loop fastener.

4. The device of claim 1 wherein one said fastening elements comprises a magnetic component and another of said fastening element elements comprises a magnetic or ferromagnetic component for selective magnetic coupling with said magnetic component.

5. The device of claim 1 wherein said at least one slit comprises a plurality of slits that reside in non-intersecting relation to one another, and each originate from a different respective starting point from which the slit extends toward the outside perimeter edge.

6. The device of claim 5 wherein each respective starting point resides at an outwardly spaced radial distance from the center point of the disc.

7. The device of claim 1 wherein each slit originates at a respective hole in the disc, said respective hole residing at a location spaced radially inward from the outside perimeter of the disc.

8. A method of using the soil covering device of claim 1, said method comprising:
with the first and second fastening elements uncoupled from one another, and the slit therefore opened, slipping the open slit around a stalk of the bagged or potted plant from a first side thereof to place the fastening elements on an opposing second side of the stalk; and
coupling said fastening elements together into a mated state on said second side of the stalk, thereby forming a fully closed loop around said stalk, and with the fastening elements in said mated state, laying the disc flat atop the soil surface of the bagged or potted plant in said working position to achieve said substantially full coverage of said soil surface from adjacent the stalk of the bagged or potted plant up to the round rim of the bag or pot of said bagged or potted plant, whereby the mated state and the coupled-together fastening elements prevent inadvertent opening of said closed loop, thereby maintaining a full 360-degree span of said substantially full coverage of said soil surface around said stalk.

9. A soil covering device for covering soil shared by a plurality of bagged or potted plants sharing a common pot or grow bag, said cover comprising a round disc of flexible fabric and has an outside perimeter edge situated at a radial distance from a center point of said disc and running along a circular path in a circumferential direction around said center point, and a plurality of slits in said disc that emanate outwardly toward, and intersect with, said outside perimeter edge, wherein said plurality of slits residing in non-intersecting relation to one another at angularly spaced positions around a center point of the disc, and each originate from a different respective starting point from which the slit extends toward the outside perimeter of the disc, whereby during placement of the device into a working position laid flat atop said soil, each slit accommodates a respective stalk of one of said bagged or potted plants of said common pot or grow bag, and wherein each slit is bordered on opposite sides thereof by respective first and second boundary edges of said disc that respectively denote terminal boundaries of first and second edge regions of the disc, each slit is accompanied by a respective pair of first and second fastening elements that are respectively affixed to said respective first and second edge regions of the disc, said respective first fastening element has an affixed portion that overlies the respective first edge region of the disc and is affixed thereto, and a free portion that juts outwardly beyond said respective first edge region in overhanging relation from the respective first boundary edge in the circumferential direction of the disc, and said free portion overhangs from the first boundary edge by a distance that, in the circumferential direction of the disc, exceeds a width of the respective slit so that the free portion spans fully across the slit into overlapping relation and fastened connection to the respective second fastening element attached to the respective second edge region, thereby achieving a flat working position of the disc that is void of both (a) any overlapping of the disc with itself at either boundary edge on either side of any slit, and (b) any deviation to a circumferential outer shape of the disc at the outer perimeter thereof, whereby the flat working position is operable, upon closing of the disc into said flat working position around the stalks of the bagged or potted plants, to lay the disc flat atop a soil surface of the bagged or potted plants in substantially full coverage of said soil surface from adjacent the stalks of the bagged or potted plants up to a round rim of the common pot or grow bag.

10. The device of claim 1 wherein said flexible fabric is weed barrier fabric.

11. The method of claim 8 wherein said flexible fabric is weed barrier fabric.

12. The device of claim 9 wherein said flexible fabric is weed barrier fabric.

13. The device of claim 1 wherein said flexible fabric is water permeable.

14. The method of claim 8 wherein said flexible fabric is water permeable.

15. The device of claim 9 wherein said flexible fabric is water permeable.

16. The device of claim 1 wherein the first and second fastening elements are affixed to the disc in positions each spanning a full length of the slit from an originating end thereof to the outer perimeter edge of the disc, such that placement of said first and second fastening elements into said overlapping relation and fastened connection to one another fully closes the slit over said full length thereof.

17. The device of claim 9 wherein the respective first and second fastening elements at each slit are affixed to the disc in positions each spanning a full length of the respective slit from an originating end thereof to the outer perimeter edge of the disc, such that placement of said respective first and second fastening elements into said overlapping relation and fastened connection to one another fully closes the respective slit over said full length thereof.

* * * * *